Figure 1:
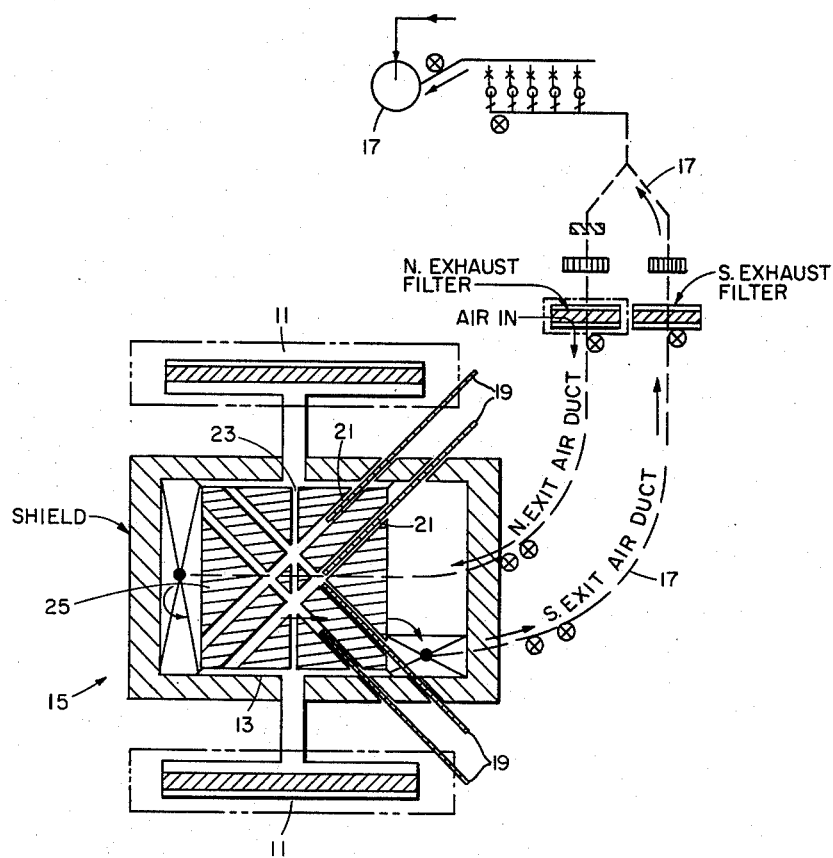

INVENTOR.
DONALD G. SCHWEITZER
ROBERT M. SINGER
DAVID H. GURINSKY

May 11, 1965 D. G. SCHWEITZER ET AL 3,183,166
LOW TEMPERATURE GRAPHITE RADIATION DAMAGE REMOVAL
Filed Aug. 23, 1962 4 Sheets-Sheet 3

INVENTOR.
DONALD G. SCHWEITZER
ROBERT M. SINGER
DAVID H. GURINSKY
BY

May 11, 1965  D. G. SCHWEITZER ET AL  3,183,166
LOW TEMPERATURE GRAPHITE RADIATION DAMAGE REMOVAL
Filed Aug. 23, 1962  4 Sheets-Sheet 4

INVENTOR.
DONALD G. SCHWEITZER
BY ROBERT M. SINGER
DAVID H. GURINSKY

United States Patent Office 3,183,166
Patented May 11, 1965

3,183,166
LOW TEMPERATURE GRAPHITE RADIATION DAMAGE REMOVAL
Donald G. Schweitzer and Robert M. Singer, East Islip, and David H. Gurinsky, Center Moriches, N.Y., assignors to the United States of America as represented by the United States Atomic Energy Commission
Filed Aug. 23, 1962, Ser. No. 219,088
3 Claims. (Cl. 176—38)

This invention relates to a method for removing radiation damage from graphite.

In the operation of nuclear reactors, the reactor graphite in the reactors is damaged by nuclear radiation. This damage is associated with the accumulation of stored energy in the graphite and dimensional growth in the graphite.

The requirements to be met in removing the radiation damage from such graphite are rather severe. The removal should avoid appreciable oxidation of the graphite and long down times or other diffculties encountered in raising the graphite to a high annealing temperature. Further, the release of stored energy should be at a slow rate to avoid the safety hazards involved in the fast release of this stored energy such as has been encountered heretofore. It is also desirable predictably and repeatedly to remove the damage from the graphite so as to retain dimensional stability in graphite and to avoid high material stresses and movements that can alter critical design specifications of the reactor. The solution to these problems has been difficult or unforeseen, however, due to the accumulation of radiation damage that could only be removed at high temperatures or in some cases not removed at all.

It has been discovered in accordance with this invention that the graphite can be irradiated and annealed at low temperatures to remove substantially all the accumulated dimensional radiation damage in the graphite, repeatedly and reproducibly. The method involved in this invention utilizes standard and well known techniques and apparatus and is highly flexible for a wide range of applications where reactor graphite is exposed to radiation. More specifically this invention involves not only low temperature annealing above the irradiation temperature, but also alternate frequent short irradiations to be utilized effectively. With the proper selection of annealing temperature and alternate irradiation interval, as hereinafter to be more particularly described, it is possible by this invention substantially to remove all dimensional damage predictably, efficiently and quickly from graphite from the beginning of its use so as to retain dimensional stability and to remove damage from graphite that has been previously irradiated for a long period of time. Also, the removal of the stored energy is at a slow and safe rate with little or no oxidation of the graphite from an air containing atmosphere adjacent to the graphite which is annealed.

It is therefore, an object of this invention to achieve dimensional stability in graphite exposed to nuclear radiation.

It is another object of this invention to prevent radiation damage in graphite that must be removed at high temperatures.

It is another object of this invention to anneal graphite while substantially preventing oxidation of the graphite and fast release of stored energy therefrom.

It is also an object of this invention to remove radiation damage from graphite that has been previously irradiated for long periods of time.

Various other advantages and objects will appear more fully from the following detailed description of embodiments of this invention, and the novel features will be particularly pointed out hereinafter in connection with the appended claims.

Figure 2:
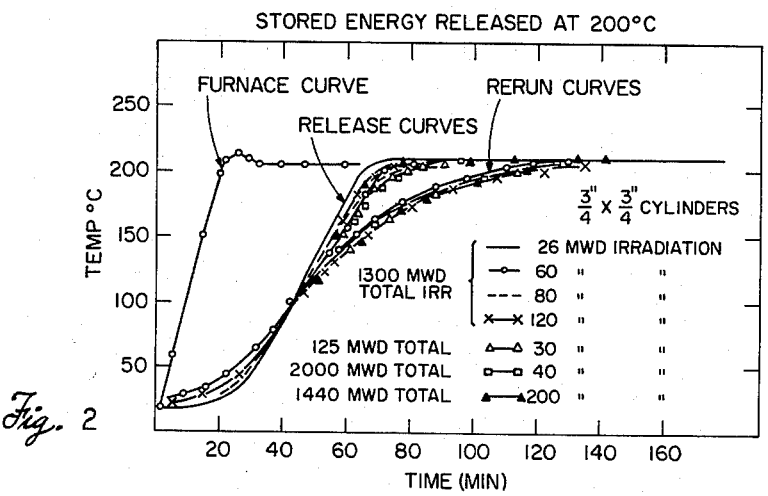
Figure 4:
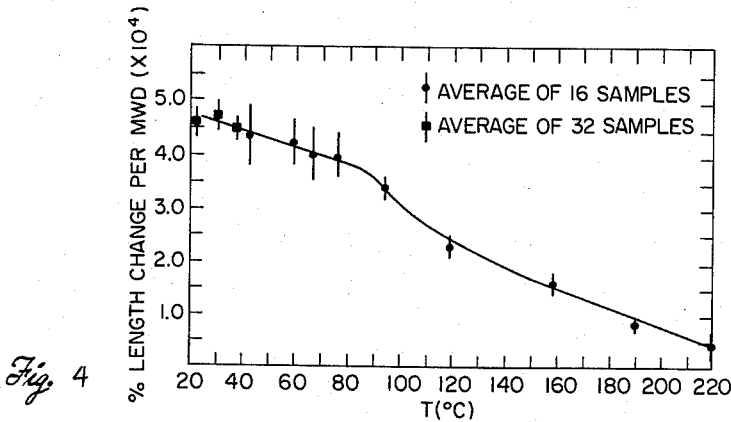
Figure 5:
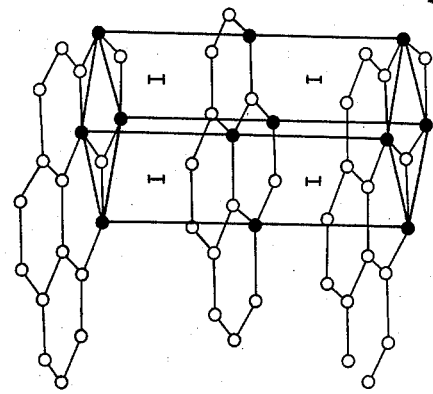
Figure 7:
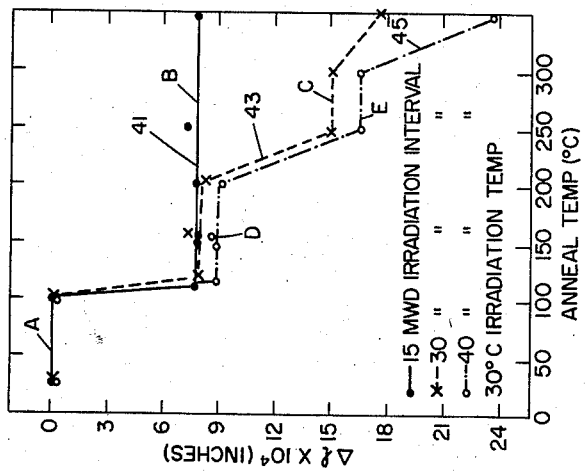
Figure 3:
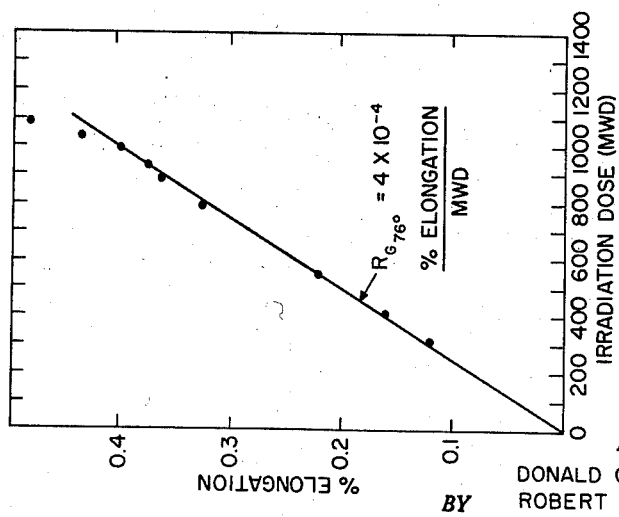
Figure 6:
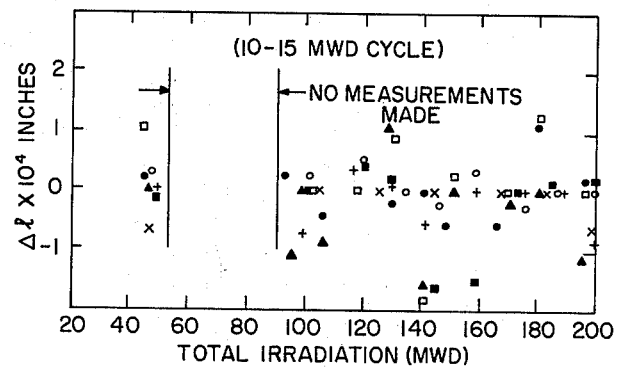
Figure 8:
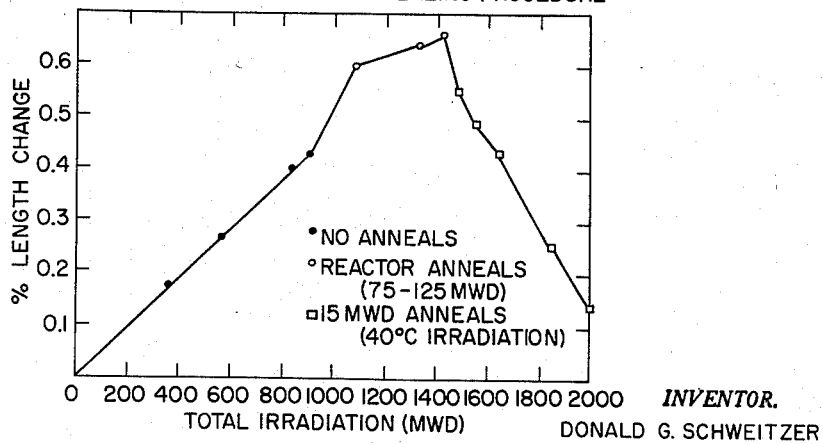

In the drawings:
FIG. 1 is a partial cross-section of a typical graphite moderated reactor;
FIG. 2 is a graphic representation of low temperature slow release of stored energy from graphite subjected to various irradiations wherein the ordinate represents temperature in degrees centigrade and the abscissa represents time in minutes;
FIG. 3 is a graphic representation showing the expansion of graphite vs. radiation dose at 76° C.;
FIG. 4 is a graphic representation of dimensional radiation damage in graphite vs. radiation temperature;
FIG. 5 is a graphic representation of a graphite crystal;
FIG. 6 is a graphic representation of the prevention of dimensional radiation damage accumulation in various graphite samples irradiated from 10–15 mwd. wherein the ordinate represents the difference in length $\times 10^4$ inches of graphite and the abscissa represents the total irradiation in megawatt days per adjacent ton of uranium;
FIG. 7 is a graphic representation of $\Delta$ length vs. anneal temperature;
FIG. 8 is a graphic representation of low temperature anneals in graphite that has been previously irradiated with nuclear radiation in a nuclear reactor wherein the ordinate represents the percent length change of the graphite and the abscissa represents the radiation interval in megawatt days per adjacent ton of uranium, where 1 mwd. equals $7 \times 10^{16}$ n.v.t. for neutrons with energies greater than 0.6 mev.

This invention is useful in stabilizing and removing radiation damage and its associated dimensional growth from nuclear reactor graphite exposed to radiation in nuclear reactors, i.e. graphite used in nuclear reactors. This graphite has high purity and low neutron capture cross-section as described in, "The Production and Properties of Graphite for Reactors" by L. M. Currie, V. C. Hamister, and H. G. MacPherson in vol. 8 of the 1955 Proceedings of the Internat. Conference on the Peaceful Uses of Atomic Energy, p. 451. Such graphite is used for example for moderation and reflecting but reactor grade graphite for other uses may be inserted in a nuclear reactor and the radiation damage removed therefrom in accordance with this invention. One illustration of such other uses is the use of reactor grade graphite in the graphite-rhenium thermocouple described in co-pending U.S. application S.N. 70,084, filed November 17, 1960, by Allen Eshaya, now U.S. Patent 3,077,505.

Referring to FIG. 1, by way of illustration and for convenience, this invention will be described in connection with its use with the nuclear reactor graphite and the Brookhaven National Laboratory air-cooled, graphite moderated, research reactor, hereinafter referred to as the BGRR, but this invention is equally useful with the nuclear reactors described in U.S. Patent 2,798,847. The BGRR, as described in many publications including "U.S. Research Reactor Operation and Use," edited by Joel W. Chastain, Jr., 1958, has air-cooling means. As shown in FIG. 1 herein, atmospheric air passes in suitable inlets 11 for circulation through cooling channels 13 of the reactor 15 and out an exhaust 17 to maintain a desired temperature in the reactor 15. The control rods 19, a portion of which are shown in FIG. 1, move back and forth in channels 21 to vary the power output of the reactor 15. This varies the irradiation field therein as is well known. The central gap 23 in which air circulates in the Brookhaven Reactor is shown also, for example, on page 331 of the "Directory of Nuclear Reactors," vol. II, 1959, by the International Atomic Energy Agency. This latter publication also describes the controls for this reactor as well as the other operating features and specifications therefor. As described, this reactor has an average equilibrium power level of 20 megawatts and contains 55 kilograms of enriched uranium.

It is well known that the irradiation of the moderator graphite 25 in the BGRR causes large amounts of radiation damage such as stored energy and dimensional growth in the graphite. FIG. 3 shows an example of elongation vs. irradiation dose in terms of mwd. where one megawatt day per adjacent ton of uranium equals $7 \times 10^{16}$ n.v.t. for neutrons with energies greater than 0.6 million electron volts (mev.). These abbreviations are well known and are described in more detail in Woods, W. K., "Irradiation Damage to Carbon Moderator Material," Proceedings of the International Conference on Peaceful Uses of Atomic Energy, 1955, vol. 7, p. 455, paper 746. The radiation damage has been particularly great in graphite irradiated below 250° C. and FIG. 4, for example, shows the rate of growth per mwd. as a function of irradiation temperature.

It has also been found that energy (in the form of heat) can be released from irradiated graphite and a method of experimentally determining this release is illustrated in FIG. 2 where unirradiated graphite is first placed in a furnace held at a constant temperature. The graphite temperature increases with time in the manner depicted by the bottom (rerun) curve in the figure. If an irradiated sample containing stored energy is treated in a similar fashion (upper "release" curve in the figure) the temperature increases as before until a point is reached where the stored energy is released. The heat resulting from the release causes the temperature of the sample to increase further and the amount of stored energy released is determined from the area between the temperature-time curves of the irradiated and unirradiated samples. Such experiments have shown that the amount of stored energy release increases as the irradiation exposure increases and the rate of this release often goes up as the annealing temperature is increased. Thus, a point may be reached where the stored energy release can cause dangerous conditions as is well known.

It has additionally been found that the graphite oxidation increases exponentially with increasing temperature. For example, at 400° C. the oxidation rate of the BNL graphite is about 0.06% per day, at 300° C. 0.005% per day, while at 250° C., or below, standard measuring instruments indicate substantially no oxidation.

In order to explain how the method of this invention accomplishes the removal of radiation damage from reactor graphite, reference is made to the appropriate portion of FIG. 3 which shows dimensional changes occurring in graphite as a result of continuous irradiation in the BGRR without anneals. FIG. 4 shows that the rate of these changes decreases at irradiation temperatures from about 20° to 220° C. These changes are explained by the fact that the displaced carbon atoms produced by collisions of energetic neutrons with the graphite lattice of the reactor are retained in the graphite lattice in interstitial positions illustrated generally as I in FIG. 5. The energy content of the lattice increases because of the production of these interstitials and the vacancies left thereby so as to result in dimensional growth. These interstitials and vacancies are hereafter referred to generally as radiation damage defects. The dimensional growth associated therewith was only slowed down but not stopped by annealing after 75–125 mwd. exposures.

Should the graphite be exposed to periodic irradiations of up to only 15 mwd./a.t. followed respectively by anneals at 150° C. the dimensional growth in the graphite is completely recovered and dimensional stability is achieved as shown by the results illustrated in FIG. 6. Here the several samples illustrated were irradiated periodically to exposures of 10–15 mwd. in the BGRR and annealed in between the irradiations at 150° C. in an electric oven. As shown by the ordinate, the dimensional growth from the original dimension expressed as $\Delta l \times 10^4$ inches was very small or substantially eliminated consistently and repeatedly by the anneals even up to large totals irradiations indicated by the abscissa.

The appropriate portion of FIG. 7 illustrates that dimensional recovery after a 15 mwd. exposure was obtained after an annealing temperature of about 110° C. was reached and after this recovery was completed higher temperatures did not cause any more dimensional recovery. This is in contrast to 30 mwd. and 40 mwd. exposures where 110° C. anneals removed radiation damage to a plateau of removal and higher temperatures removed further radiation damage to further plateaus of removal.

A sample exposed to a 15 mwd. is illustrated by the solid line 41 in FIG. 7. No dimensional recovery was obtained along the plateau A, formed by plotting the dimensional recovery in $\Delta l \times 10^4$ inches of the graphite from the start of annealing versus the temperature of the annealing from the temperature of the irradiation (30° C.) to about 110° C. At that temperature large amounts of dimensional recovery are obtained until recovery plateau B is reached whereupon no further recovery is obtained even though the annealing temperature is increased to well above 300° C. Contrasting this with the sample exposed to a 30 mwd. dose and illustrated by the dashed line 43 a temperature of about 110° C. provides dimensional recovery to a plateau corresponding with the described plateau B and at a temperature of between 200° C. and 250° C. further recovery produces a further recovery plateau C until a temperature of about 300° C. is reached whereupon still further recovery takes place. The recovery plateaus D and E of the sample exposed to a dose of 40 mwd. are illustrated by line 45 and these plateaus correspond to the recovery plateaus B and C of the sample exposed to a 30 mwd. dose, but plateaus D and E are lower on the graph illustrating more recovery at respective recovery temperatures.

The short irradiations of this invention alternated with low temperature annealings produce decomposition reactions which result in radiation contraction effects that are not observed in continuously irradiated graphite. It is theorized that these decomposition reactions are fast relative to the formation reactions so that intermediate defect species in a chain rapidly attain equilibrium and their concentrations effectively remain constant when one end of the chain is removed. Also, the removal of a smallest species may be theorized and the removal of these species may be indirectly effective in removing a larger species while intermediate defects remain in steady state concentrations.

In a practical arrangement for dimensionally stabilizing nuclear reactor graphite, the method of this invention comprises the steps of alternately annealing and periodically irradiating said graphite for short irradiation intervals. In one embodiment the irradiation is at an equilibrium irradiation temperature of 30° C. in reactor such as the BGRR. In the BGRR an exposure of 15 mwd./a.t. is accomplished in about 3 weeks at an equilibrium of 20 mw. power output where one megawatt day (mwd.) per adjacent ton of uranium equals $7 \times 10^{16}$ n.v.t. for neutrons with energies greater than 0.6 million electron volts (mev.). This produces for example radiation damage defects in the graphite that reach a steady state within said exposures. Thereupon the graphite temperature should be increased to the necessary annealing temperature. This temperature removes the radiation damage produced in the graphite during the preceding irradiation exposure. For example an annealing temperature of 150° C. removes the radiation damage in exposures of 15 mwd. Then the radiation exposure is repeated. Thus, radiation damage that must be removed at high temperatures is prevented and the radiation induced defects produced in the graphite are reduced consistently and predictably between irradiations to a low level corresponding to the level of said defects present at the beginning of each of said irradiations. Also, dimensional stability, which was not known heretofore, is provided in the graphite, while providing little or no oxidation. Additionally, the low annealing temperature leads to a slow, steady, and safe stored energy release while material stresses and movements are minimized.

As illustrated by the following Table I, a plurality of small reactor grade graphite samples were annealed at 150° C. in a standard electric oven and alternately irradiated periodically in the test holes of the BGRR at 30° C. to respective irradiations of 10–15 mwd./a.t. and all the samples remained dimensionally substantially stable. The results in the table are taken from measurements using a Sheffield Optical Comparator on ¾″ diameter cylinders of four inch and two inch lengths where the typical dimensional change was only up to 0.2%.

TABLE I

*Irradiation and annealing cycle=10–15 mwd./a.t.*

[(1 mwd./a.t.=7×10$^{16}$ n.v.t. for neutrons with energies greater than 0.6 mev.). No measurements were made before a total exposure of 51 mwd./a.t. or between 51 and 102 mwd./a.t.]

SAMPLE A-9
[Original size=2.00199 inches]

| Size after irradiation (inches) | Size after anneal (inches) | Total Exposure (mwd./a.t.) |
|---|---|---|
| ---------- | 2.00230 | 51 |
| ---------- | 2.00190 | 102 |
| 2.00202 | 2.00194 | 118 |
| 2.00209 | 2.00194 | 133 |
| 2.00199 | 2.00187 | 142 |
| 2.00210 | 2.00193 | 157 |
| 2.00207 | 2.00193 | 173 |
| 2.00247 | 2.00211 | 182 |
| 2.00220 | 2.00201 | 196 |

SAMPLE A-11
[Original size 2.00204 inches]

| Size after irradiation (inches) | Size after anneal (inches) | Total Exposure (mwd./a.t.) |
|---|---|---|
| ---------- | 2.00244 | 51 |
| ---------- | 2.00236 | 102 |
| 2.00242 | 2.00237 | 118 |
| 2.00250 | 2.00238 | 133 |
| 2.00243 | 2.00214 | 142 |
| 2.00255 | 2.00239 | 157 |
| 2.00247 | 2.00236 | 173 |
| 2.00257 | 2.00247 | 182 |
| 2.00246 | 2.00235 | 196 |

Specific examples of dimensional recovery obtained after 250° C. anneals with graphite samples in an oven following 25–30 mwd. irradiations in the BGRR are given in the following table where it is seen that complete recovery was also obtained:

TABLE II

*Irradiation and annealing cycle=25–30 mwd./a.t.*

[(1 mwd./a.t.=7×10$^{16}$ n.v.t. for neutrons with energies greater than 0.6 Mev.)]

SAMPLE B-10

| Size after irradiation (inches) | Size after anneal (inches) | Total Exposure (mwd./a.t.) |
|---|---|---|
| ---------- | ---------- | 25 |
| ---------- | 2.00080 | 52 |
| ---------- | 2.00118 | 104 |
| 2.00120 | 2.00104 | 120 |
| 2.00132 | 2.00115 | 145 |
| 2.00128 | 2.00111 | 176 |
| 2.00128 | 2.00114 | 199 |

SAMPLE B-11

| Size after irradiation (inches) | Size after anneal (inches) | Total Exposure (mwd./a.t.) |
|---|---|---|
| ---------- | ---------- | 25 |
| ---------- | 2.00255 | 52 |
| ---------- | 2.00269 | 104 |
| 2.00279 | 2.00260 | 120 |
| 2.00289 | 2.00260 | 145 |
| 2.00296 | 2.00266 | 176 |
| 2.00312 | 2.00272 | 199 |

Should the irradiation and annealing interval be alternated frequently and the irradiation exposure be 15 mwd., it is seen from the appropriate portion of FIG. 8 that the physical growth in graphite samples theretofore irradiated is recovered to a point where the growth is substantially completely removed. This in contrast to anneals in the BGRR of samples after 75–125 mwd. doses where an excess of dimensional recovery was not obtained in the anneals over the growth recorded in the preceding respective irradiations. Actual tests for removing radiation damage from previously irradiated reactor graphite are illustrated by the following practical operating sequence in the BGRR moderator graphite 25 where the graphite had accumulated 495.3 mwd. energy since its last anneal bringing the total of 72,776.58 mwd.

In this cycle of operating according to this invention, the reactor power level is reduced to 5 mw. by inserting the control rods 19 in the usual manner and the bi-directional air flow through inlet 11 is reduced to about 10,000 cubic feet/min. minimum. This level is maintained until a reactivity of about 100 in-hours is achieved and sufficient Xenon decays are removed to enable the reactor to be restarted. Thereafter, the power is completely quenched at a rate of 2° C./minute in the fuel temperature by inserting the control rods 19 further into the reactor. Specifically, two control rods are inserted slowly all the way into the reactor and one control rod is inserted for meters into the reactor. Utiizing the heat in the reactor, the air flow becomes unidirectional, e.g. north to south and the flow is decreased until the temperature of the cooling channel 13 increases and the graphite 25 normally operating below 110° C. increases, this being the major portion of the graphite 25. This flow reduction reduces heat loss from the graphite and transfers heat to the normally cooler graphite near the central gap 23. The proper annealing temperature to which the graphite is raised is 110° C. to 250° C. as measured by suitable existing thermocouples. The graphite then cools at 50° C. per hour by suitably increasing the air flow first unidirectionally and then bi-directionally. The reactor is restarted at a rate of 2° C. per minute temperature rise in the hottest part of the reactor fuel until a maximum of 240° C. is reached in the fuel. Then the control rods 19 and the air flow through the reactor are adjusted to increase the fuel to 350° C. and to maintain an equilibrium power level of 20 mw. for 15 mwd./a.t. The described cycle is repeated over and over again periodically every 15 mwd./a.t.

During the first 15 mwd./a.t. exposure a small amount of dimensional growth was produced which could be removed by the anneal at from 110° C. to 250° C., and no dimensional growth was produced which could not be removed at this annealing temperature. Additionally, 10% of the dimensional growth between a previous 350° anneal and its succeeding 194 mwd. exposure was removed In subsequent low temperature anneals, an excess of dimensional growth was removed over the dimensional growth produced in the respective preceding irradiations thereby removing the previous dimensional growth associated with the previous radiation damage. This growth had been in some cases irreversible theretofore and even with high temperature anneals the limits of the reactor adjustments for graphite growth were reached. With this invention, the graphite may be returned to its original dimensions and continuation of the described 15 mwd. exposures and 110° C.–250° C. anneals periodically over and over retains dimensional stability in the graphite.

The low temperature annealing of this invention is repeatable and predictable and avoids large material stresses, large structural movements, safety hazards and difficulties such as were known heretofore in the operation of nuclear reactors. Moreover, the low temperatures of this invention provides little or no oxidation of the graphite and standard apparatus and equipment are used with this novel annealing method while the release of stored energy takes place without large time consumption and is at a slow, safe, and steady rate.

What is claimed is:

1. The method of annealing graphite in an air cooled nuclear reactor in which irradiation has produced stored energy and positive length change in the graphite, comprising heating said graphite in air to 150° C. for producing negative length change and stored energy release in said graphite, irradiating said graphite for producing a positive length change of only .00030 inch in said graphite, and heating said graphite in air to 150° C. for providing further stored energy release and removal of the positive length change in said graphite caused by the preceding irradiation, said graphite being maintained at a maximum temperature below 250° C. whereby said graphite is prevented from being greatly oxidized and the release of large destructive amounts of stored energy is prevented.

2. The method of annealing graphite in an air cooled nuclear reactor in which irradiation has produced stored energy and positive length change in said graphite, comprising heating said graphite in air to 150° C. for providing negative length change and stored energy release in said graphite, irradiating said graphite at 30° C. with neutrons having energies greater than 0.6 million electron volts for producing a positive length change of .0030 inch in said graphite, and heating said graphite in air to 150° C. for providing further stored energy release and removal of the positive length change in said graphite caused by the preceding irradiation, said graphite being maintained at a maximum temperature below 250° C. whereby said graphite is prevented from being greatly oxidized and the release of large destructive amounts of stored energy is prevented.

3. The method of annealing an air cooled nuclear reactor having moderator graphite that is heated to produce negative length change and stored energy release in said graphite and irradiated to produce positive length change and stored energy in said graphite, comprising the steps of providing said heating between 100° and 250° C. for producing negative length change and stored energy release in said graphite, providing said irradiation for producing a positive length change of below .0075% in said graphite, and providing said heating to between 100° and 250° C. for producing further stored energy release in said graphite and negative length change in said graphite in excess of the positive length change produced in said graphite by said latter irradiation whereby positive length change in said graphite is removed for stabilizing said graphite, said graphite is prevented from being greatly oxidized and the release of large destructive amounts of stored energy is prevented.

References Cited by the Examiner

TID-7565 (Pt. 1), U.S./U.K. Graphite Conference, March 16, 1959, pages 1–10, 22, and 46–63.

CARL D. QUARFORTH, *Primary Examiner.*